March 8, 1966  R. F. COOK, JR  3,238,618
ELECTRIC CABLE INSULATION CUTTER
Filed Dec. 10, 1963
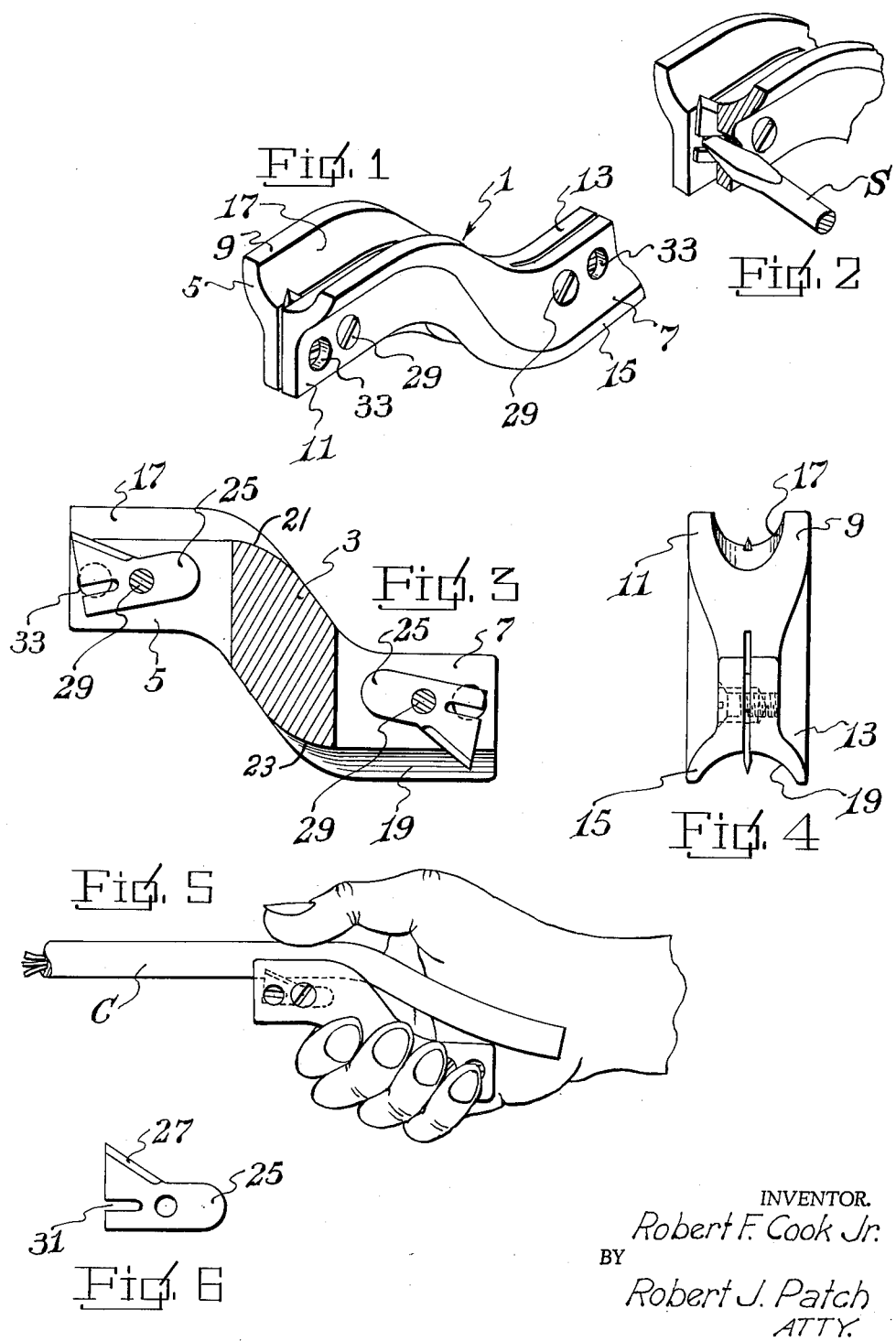
INVENTOR.
Robert F. Cook Jr.
BY
Robert J. Patch
ATTY.

3,238,618
ELECTRIC CABLE INSULATION CUTTER
Robert F. Cook, Jr., 531 S. 99th East Ave., Tulsa, Okla.
Filed Dec. 10, 1963, Ser. No. 329,480
2 Claims. (Cl. 30—91)

The present invention relates to electric cable insulation cutters, and particularly implements adapted to slit the rubber or plastic covering on the end of an electric cable so that the insulation may be removed and the inner insulated wires exposed for splicing. In the present invention, the implement has a cutting blade that has a recess that registers with a recess in the implement to receive a tool that adjusts the position of the blade.

It is an object of the present invention to provide an implement for cutting electric cable insulation, adapted to cut the insulation longitudinally of the cable.

Another object of the present invention is the provision of an implement for cutting electric cable insulation, adapted for use on cables of substantially different sizes.

Still another object of the present invention is the provision of an implement for cutting electric cable insulation, in which the depth of the cut may be accurately adjusted.

Finally, it is an object of the present invention to provide an implement for cutting electric cable insulation, which will be relatively inexpensive to manufacture, quick and easy to adjust and operate, and rugged and durable in use.

Other objects and advantages of the present invention will become apparent from a consideration of the following description, taken in connection with the accompanying drawing, in which:

FIGURE 1 is a perspective view of an implement according to the present invention;

FIGURE 2 is a view of a fragment of FIGURE 1, with parts broken away to show the operation of adjusting a blade of the implement of the present invention;

FIGURE 3 is a side elevational view with parts broken away of the implement of the present invention;

FIGURE 4 is an end elevational view of the implement of the present invention;

FIGURE 5 is a view showing the implement of the present invention in use in the operation of slitting the insulation on an electric cable; and FIGURE 6 is a side elevational view of a cutter blade according to the present invention.

Referring now to the drawing in greater detail, there is shown an implement according to the present invention, indicated generally at 1. Implement 1 has a central portion 3 and a pair of opposite end portions 5 and 7. Each end portion 5 and 7 is bifurcated. Thus, end portion 5 is characterized by a pair of parallel spaced legs 9 and 11, while end portion 7 is characterized by a pair of spaced parallel legs 13 and 15. In general, legs 9 and 11 are mirror images of each other, while legs 13 and 15 are also mirror images of each other about a vertical plane viewed edgewise in FIGURE 4.

Legs 9 and 11 have surfaces that between them define a partial cylindrical recess 17, while legs 13 and 15 have surfaces that between them define a partial cylindrical recess 19. Recess 17 is of a radius substantially shorter than the radius of recess 19. The axes of recesses 17 and 19 are parallel to each other and are spaced a substantial distance apart and open away from each other. Recess 17 terminates in the direction of recess 19 in a sloping shoulder 21, while recess 19 terminates in the direction of recess 17 in a sloping shoulder 23, as seen in FIG. 3. Thus, implement 1 is of sinuous configuration overall, the end portions 5 and 7 being laterally offset from each other. Generally speaking, therefore, end portions 5 and 7 extend lengthwise parallel to each other but are offset by a central portion 3 which is inclined at equal angles to both end portions.

A flat cutting blade 25 is disposed between legs 9 and 11, and another flat cutting blade 25 is disposed between legs 13 and 15. Cutting blades 25 may be identical to each other but are upside down and reversed relative to each other. Each blade 25 has a cutting edge 27 that is inclined relative to the associated recess 17 or 19 but is adapted to extend a substantial distance into recess 17 or 19. Cutting edges 27 are inclined outwardly in a direction from central portion 3 toward either end portion 5 or 7. Each blade 25 is mounted for swinging movement in its plane about a screw 29 passing through legs 9 and 11, and another screw 29 passing through legs 13 and 15. Screws 29 are parallel to each other and blades 25 are coplanar. Screws 29 are perpendicular to but spaced from the axes of the adjacent recesses 17 and 19. The plane parallel to the axis of recess 17 that includes the axis of the adjacent screw 29 and the plane parallel to the axis of recess 19 that includes the adjacent screw 29 are parallel to each other but spaced apart the distance of lateral offset of the two screws 29. The axis of recess 17 lies a substantial distance outside space between those two planes, as is also the axis of recess 19 but on the opposite side of the space between those two planes. Screws 29 have slotted heads and so engaged between legs 9 and 11 or 13 and 15 that upon turning of a screw 29 the corresponding pair of legs will be drawn together to clamp blade 25 between them in a swung and adjusted position of blade 25.

In order to swing blade 25, each blade 25 is provided with a slot 31 that extends inwardly from an end blade 25 generally radially of the axis of swinging movement of blade 25. At about the same location as slots 31, at least one of legs 9 and 11 and at least one of legs 13 and 15 also have holes 33 therethrough. If desired, only one leg at each end portion 5 and 7 of the implement need have a hole 33 therethrough, but it is preferred to have holes 33 in registry with each other through both legs at each end of implement 1 to provide access to blade 25 through those holes from either side of the implement.

The operation of slitting electric cable insulation is shown in FIGURE 5. As will there be apparent, the implement is held in the hand while an end of a cable C is placed in the recess 17 or 19 of appropriate radius considering the radius of the cable C. The cable is then drawn to the left as seen in FIGURE 5, or the implement 1 is drawn to the right as seen in FIGURE 5, and that portion of cutting edge 27 of the associated blade 25 which projects into the associated recess 17 or 19 penetrates the insulation of the cable and slits it longitudinally of the cable, after which the insulation can be peeled off for purposes of splicing.

In use, blades 25 are clamped fixedly between their associated legs by tightening screws 29. To regulate the depth of cut of blade 25, however, the associated screw 29 is backed off somewhat until pressure on the associated blade 25 will cause it to turn. That pressure is applied by inserting a tool through the associated hole 33 into the slot 31 of the blade to be adjusted. This can easily be done as shown in FIGURE 2 by use of a screw driver; however, any variety of implements can be used to make the adjustment. With the tip of the screw driver extending through hole 33 and into slot 31, the screw driver can then be manipulated so as to move blade 25 in either direction about its pivotal bearing screw 29 until just enough cutting blade 27 extends into the associated recess 17 or 19 in order to cut no deeper than the insulation. Screw 29 can then again be tightened to lock the blade in its adjusted position. It is sometimes convenient, in determining the depth of the cut, to place an end of the uncut cable in recess 17 or 19 so that the height of cutting edge 27 within recess 17 or 19 can be compared with the thickness of insulation about the exposed wires.

Another important feature of the invention is that cables of various sizes may be used depending on which recess 17 or 19 is used. The provision of implement 1 as a double-ended implement, however, is much more than an aggregation of parts of different size, for the lateral offset of end portions 5 and 7 relative to each other assures that the implement can be grasped in the manner of a pistol grip, as seen in FIGURE 5, without danger of cutting the hand on the unused cutting edge 27. Shoulders 21 and 23 serve as means defining that pistol grip.

At the same time, however, it must be recognized that the lateral offset of end portions 5 and 7 also makes it easier to hold the cable in the associated recess 17 or 19 by means of the operator's hand. FIGURE 5 illustrates why this is so. The opportunity to bend the cable somewhat about the utilized recess 17 or 19 is important to the best function of the device.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. An implement for cutting electric cable insulation, the implement having a partial cylindrical recess therein, a flat cutting blade disposed in a plane including the axis of said recess and mounted on the implement for swinging movement in said plane into said recess, the implement including a pair of legs between which at least a portion of the blade is disposed, and means for moving the legs toward each other to clamp the blade between the legs with the blade extending a desired distance into the recess, at least one of the legs having a recess therethrough registrable with a recess in the blade to permit manipulation of the blade by insertion of a tool through said leg recess.

2. An implement as claimed in claim 1, the recess in the blade comprising a slot disposed generally radially of the axis of swinging movement of the blade.

References Cited by the Examiner

UNITED STATES PATENTS

| 2,089,774 | 8/1937 | Wachstein | 30—91 X |
| 3,092,906 | 6/1963 | Derring | 30—91 |

FOREIGN PATENTS

| 571,461 | 8/1945 | Great Britain. |
| 705,668 | 3/1954 | Great Britain. |

WILLIAM FELDMAN, *Primary Examiner.*

MYRON C. KRUSE, *Examiner.*